B. C. ROCKWELL.
JOINT FOR END MATCHING LUMBER.
APPLICATION FILED FEB. 24, 1915.
1,212,262.
Patented Jan. 16, 1917.
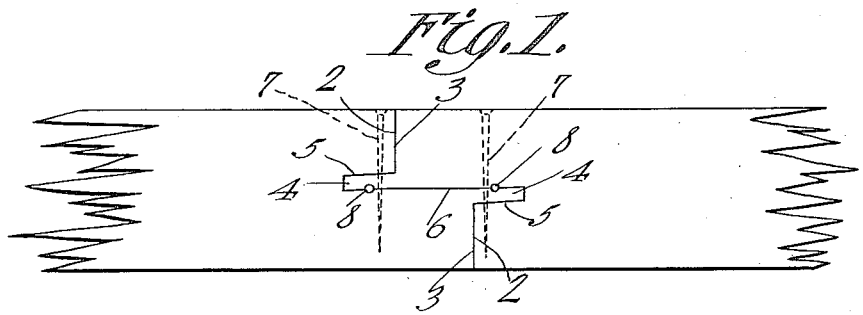
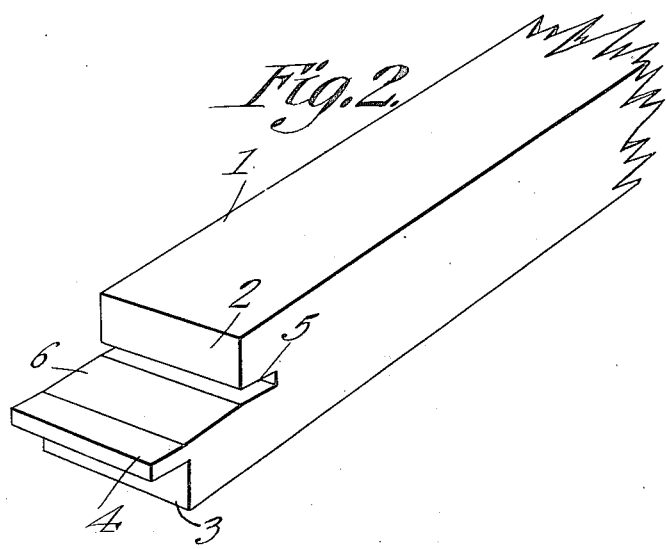
B. C. Rockwell,
Inventor
Witnesses
by
Attorneys

UNITED STATES PATENT OFFICE.

BYRD C. ROCKWELL, OF CAMDEN, ARKANSAS.

JOINT FOR END-MATCHING LUMBER.

1,212,262.
Specification of Letters Patent.
Patented Jan. 16, 1917.

Application filed February 24, 1915. Serial No. 10,290.

*To all whom it may concern:*

Be it known that I, BYRD C. ROCKWELL, a citizen of the United States, residing at Camden, in the county of Ouachita and State of Arkansas, have invented a new and useful Joint for End-Matching Lumber, of which the following is a specification.

This invention relates to a joint for the purpose of matching the ends of lumber.

One of the objects of the invention is to provide a joint especially designed for use in connecting short lengths of lumber for almost any purpose and whereby after the parts have been assembled and connected by means of a good adhesive, the joint becomes as strong if not stronger than intermediate portions of the lumber.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a joint such as constitutes the present invention. Fig. 2 is a perspective view of one end of a piece of lumber shaped in accordance with the present invention.

Referring to the figures by characters of reference 1 designates a piece of lumber having its end stepped to form shoulders 2 and 3, the distance between the two shoulders being any length desired, according to the strength to be had at the joint. Projecting from the shoulder 3 is a tongue 4 and projecting into the shoulder 2 is a groove 5 so proportioned that the tongue 4 will fit snugly therein. This groove is preferably slightly inclined, as shown, so that when a tongue 4 is forced thereinto, it will be slightly distorted and thus be caused to bind tightly upon the walls of the groove. The inclination of the groove is so slight that there is no danger of the tongue splitting when forced into the groove. The ends to be connected by means of this joint are duplicates which, when brought together, the tongue 4 on one end is forced tightly into the groove 5 in the opposed end, the longitudinal faces 6 formed between the shoulders 2 and 3 being caused to contact as shown while each shoulder 3 abuts tightly against the shoulder 2 on the opposed end. Thus the two pieces of lumber will be fit together firmly and by employing a good adhesive between the meeting faces of the joints, a very strong and efficient joint is produced. As an additional means for holding together the parts of the joint, nails or the like may be driven downwardly through the pieces of lumber so as to pass through the tongues 4, these fastening means being indicated at 7. In addition to these fastening devices 7 or in lieu thereof, nails or the like shown at 8 can be forced between the tongues 4 and the adjacent walls of the grooves 5 so as thus to act as keys to prevent withdrawal of the tongues from the grooves.

As the two parts of the joint are duplicates, it is not necessary to produce rights and lefts and the said parts can be easily, accurately and cheaply formed.

What is claimed is:

A joint for end matching lumber, including two opposed members shiftable in the direction of their length toward each other into interlocked relation, each member having a stepped end forming non-alining transverse shoulders and a relatively thin tongue extending from the outer shoulder and capable of bending, there being a groove within the inner shoulder of the same proportions as the tongue and obliquely disposed relative to the longitudinal center of the member, the walls of the groove in each member constituting means for frictionally engaging and bending the tongue of the opposed member when inserted longitudinally into the groove, thereby to hold all portions of the tongue obliquely disposed relative to the longitudinal center of the members.

In testimony that I claim the foregoing as my own, I have hereto affixed my signature in the presence of two witnesses.

BYRD C. ROCKWELL.

Witnesses:
THOMAS W. HARDY,
J. W. WARN.